(12) United States Patent
Tassinari et al.

(10) Patent No.: US 7,614,422 B2
(45) Date of Patent: *Nov. 10, 2009

(54) REED VALVE ASSEMBLY

(75) Inventors: Steven M. Tassinari, Meridan, NH (US); Scott A. Tassinari, Norwich, VT (US)

(73) Assignee: Moto Tassinari, West Lebanon, NH (US)

( * ) Notice: Subject to any disclaimer, the term of this patent is extended or adjusted under 35 U.S.C. 154(b) by 317 days.

This patent is subject to a terminal disclaimer.

(21) Appl. No.: 11/092,965

(22) Filed: Mar. 29, 2005

(65) Prior Publication Data

US 2006/0219300 A1    Oct. 5, 2006

(51) Int. Cl.
*F16K 15/16* (2006.01)

(52) U.S. Cl. ............... 137/512.15; 137/855; 123/65 V; 123/73 V

(58) Field of Classification Search ........... 137/512.15, 137/855, 856; 123/65 V, 73 V
See application file for complete search history.

(56) References Cited

U.S. PATENT DOCUMENTS

| | | | | |
|---|---|---|---|---|
| 1,306,391 A | * | 6/1919 | Romanoff | 137/512.15 |
| 2,199,307 A | * | 4/1940 | Eichelberg | 137/454.4 |
| 2,688,978 A | * | 9/1954 | Von Wangenheim | 137/512.15 |
| 3,312,237 A | * | 4/1967 | Mon et al. | 137/512.15 |
| 3,354,903 A | * | 11/1967 | Caruso | 137/512.15 |
| 4,009,366 A | * | 2/1977 | Danell | 219/208 |
| 4,058,138 A | * | 11/1977 | Viktorov et al. | 137/512.1 |
| 4,565,214 A | * | 1/1986 | Parman | 137/512.15 |
| 4,915,128 A | * | 4/1990 | Masserini | 137/512.15 |
| 5,247,912 A | * | 9/1993 | Boyesen et al. | 123/65 V |
| 5,794,654 A | * | 8/1998 | Marvonek et al. | 137/512.15 |
| 6,837,784 B2 | * | 1/2005 | Omiya et al. | 454/162 |
| 6,880,577 B2 | * | 4/2005 | Tassinari et al. | 137/855 |
| 7,028,649 B1 | * | 4/2006 | Hosaluk et al. | 123/73 V |

* cited by examiner

*Primary Examiner*—Kevin L Lee
(74) *Attorney, Agent, or Firm*—Devine, Millimet & Branch, P.A.; Paul C. Remus; Raymond I. Bruttomesso, Jr.

(57) ABSTRACT

The reed valve assembly of the present invention includes a reed cage and a retainer that includes in once piece two or more reed petals. The retainer is independently interlockable with the reed cage. As defined herein, independently interlockable is understood to mean that no additional parts are required to connect the retainer to the reed cage. As implied by the term interlockable, the retainer and reed cage are separable.

5 Claims, 6 Drawing Sheets

REED VALVE ASSEMBLY

FIELD OF THE INVENTION

The present invention relates to the field of motors. Specifically, the present invention relates to the field of reed valve assemblies. More specifically, the present invention is a reed valve assembly used in 2-stroke motors.

BACKGROUND OF THE PRESENT INVENTION

FIG. 1 shows an example of a traditional 2-stroke motor reed valve. The reed valve 10 includes a v-shaped base 12, pliable reed petals 14, and stoppers 16. The base is substantially hollow with a plurality of openings covered by the reed petals 14. In operation, air flows into the center of the base 12 and through the openings in the base 12, pushing the reed petals 14 back towards the stoppers 16. When the air reverses flow, the reed petals 14 press firmly against the base 12, covering the openings and substantially impeding airflow.

One problem with the traditional 2-stroke motor reed valve is wear on the reed petals. A reed petal opens and closes 133 times per second if the motor is running at 8,000 rpm. The resulting fatigue on the reed petals requires regular replacement of the reed petals. Therefore, a reed valve design was needed that reduced wear on the reed petals.

FIG. 2 shows a more recent example of a traditional 2-stroke motor reed valve. The reed valve 20 includes a w-shaped base 22, pliable reed petals 24, guards 26, and an inner stopper 28. The design of this reed valve 20 creates a broader opening for passage of air and improved engine performance. Also the reed petals 24 against the guards 26 are not required to bend as far for the reed valve 20 to allow more airflow than the traditional reed valve 10 because of the volume of airflow allowed past the reed petals 24 against the inner stopper 28. The reduced movement radius of the reed petals 24 reduces wear on the reed petals 24. The reed petals 24 against the guards 26 are held between the guards 26 and the base 22 by screws 30. The reed petals 24 against the inside stopper 28 are held in place by the reed cage in the base 22 and the inside stopper 28. Finally, the reed valve 20 is held in place within the motor by a flange 32, which is attached to the base 22 by screws 5.

This more recent reed valve 20 has several problems. One problem is the screws 50 attaching the base 22 to the flange 32 and the screws 30 attaching the base 22 to the guards 26. The screws required are special order screws increasing the cost of assembly. Also, with regular use and repair, the screws need to be repeatedly removed and reinserted, causing the screws and screw holes to become stripped. This can, in turn, result in the screws falling into the motor, significantly damaging the motor. Therefore a reed valve is needed that does not contain screws.

Another problem with the reed valve 20 is assembly time. The number of parts and screws to be assembled with assorted tools increases the assembly time used to make the reed valve. Labor costs cause the reed valve to be unduly expensive.

In response to these problems, the most recent example of a traditional 2-stroke motor reed valve, described in U.S. patent application Ser. No. 10/142,509, was invented.

One embodiment of this reed valve assembly 40, as shown in FIG. 3, includes a reed cage 42, a retainer 44, and reed petals 46. The retainer 44 is independently interlockable with the reed cage 42. Independently interlockable is understood to mean that no separate parts are required to connect the retainer 44 to the reed cage 42. As implied by the term interlockable, the retainer 44 and reed cage 42 are separable. The reed petals 46 are removably secured to the reed cage 42 by the retainer 44.

In that embodiment, the reed petals 46 are secured to the reed cage 42 with the retainer 44. The retainer 44 is a flange 44a, one of several possible embodiments for the retainer 44. Tabs 48 are formed in the reed cage 42. The reed petals 46, with holes 50 formed therein, fit over the tabs 48. The flange 44a is slotted 52 to accept the tabs 48, thereby interlocking the retainer 44 to the reed cage 42 and securing the reed petals 46 in place.

In another embodiment, as shown in FIG. 4, the reed valve assembly 40 has a w-shaped reed cage 42 as is designed such that the reed petals 46 pivot on the base 54 of the reed cage 42 to open at the tip 56 of the reed cage 42, allowing airflow moving from the base 54 to the tip 56. The reed petals 46 include inner reed petals 62 removably secured to the reed cage 42 by an insert 64 and outer reed petals 66 removably secured to the reed cage 42 with the flange 44a. This embodiment requires the reed cage 42 to be in a w-shape or some other multiple v-shapes (wherein the w-shape is the equivalent of abutting v-shapes). The insert 64 independently interlocks with the reed cage 42 to hold the reed petals 46 in place. The only difference between the inner reed petals 62 and outer reed petals 66 in this embodiment is the means of securing. This embodiment is further narrowed wherein the top of the inner reed petals 62 is located above the top of the outer reed petals 66.

While this most recent example of a traditional reed valve assembly, described in U.S. patent application Ser. No. 10/142,509, is an improvement over other traditional reed valves, it, nevertheless, has the problem of still requiring significant assembly time to align the reed cage, petals and retainer and to interlock them.

SUMMARY OF THE INVENTION

The present invention is based on the realization that a reed valve assembly can be designed that is less expensive and that assembles more quickly and easily. The present invention combines the reed petals and retainer of a reed valve assembly in one part that is independently interlockable with the reed cage.

Therefore, it is an object of the present invention to reduce the cost of the reed valve assembly by reducing the number of parts therein.

It is a further object of the present invention to decrease the time of assembling the reed valve assembly.

It is a further object of the present invention to maximize the durability of the reed petals.

DETAILED DESCRIPTION OF THE INVENTION

Figure 1:
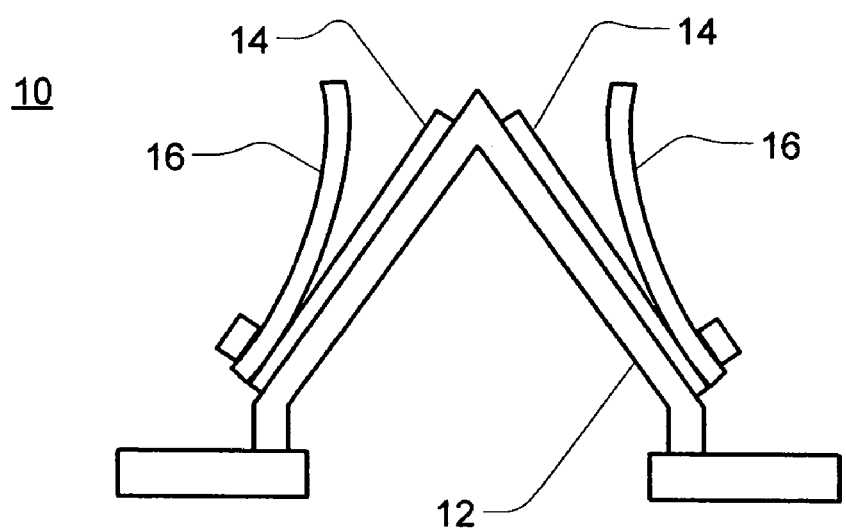
FIG. 1 is a cross-sectional diagram of a traditional reed valve in the prior art.
Figure 2:
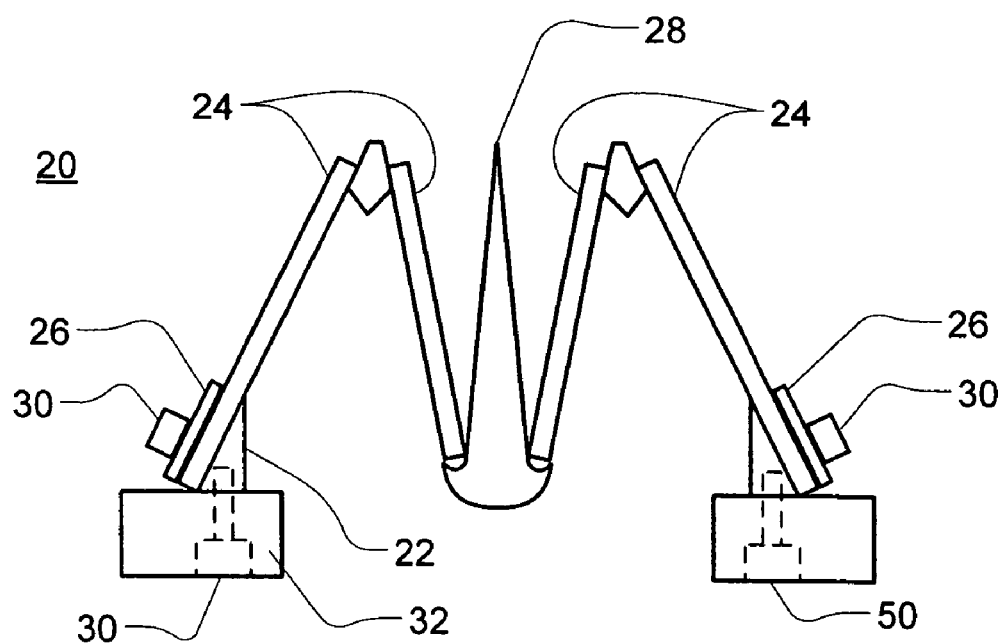
FIG. 2 is a cross-sectional diagram of another traditional reed valve in the prior art.
Figure 3:
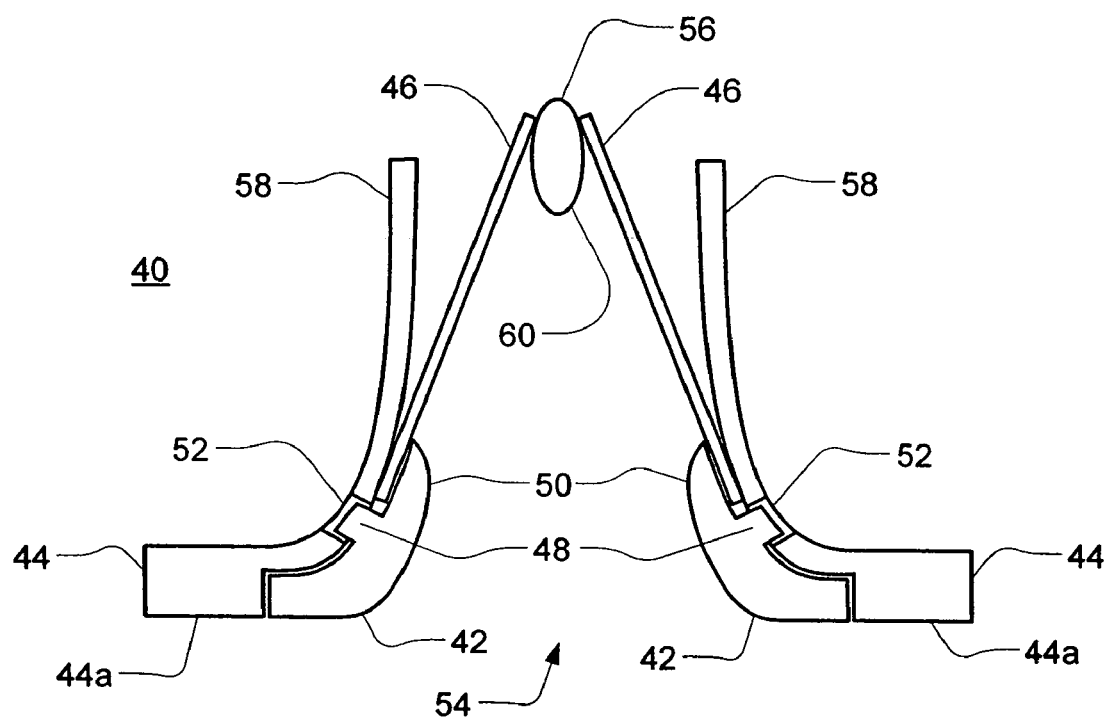
FIG. 3 is a cross-sectional diagram of a recently derived reed valve in the prior art.
Figure 4:
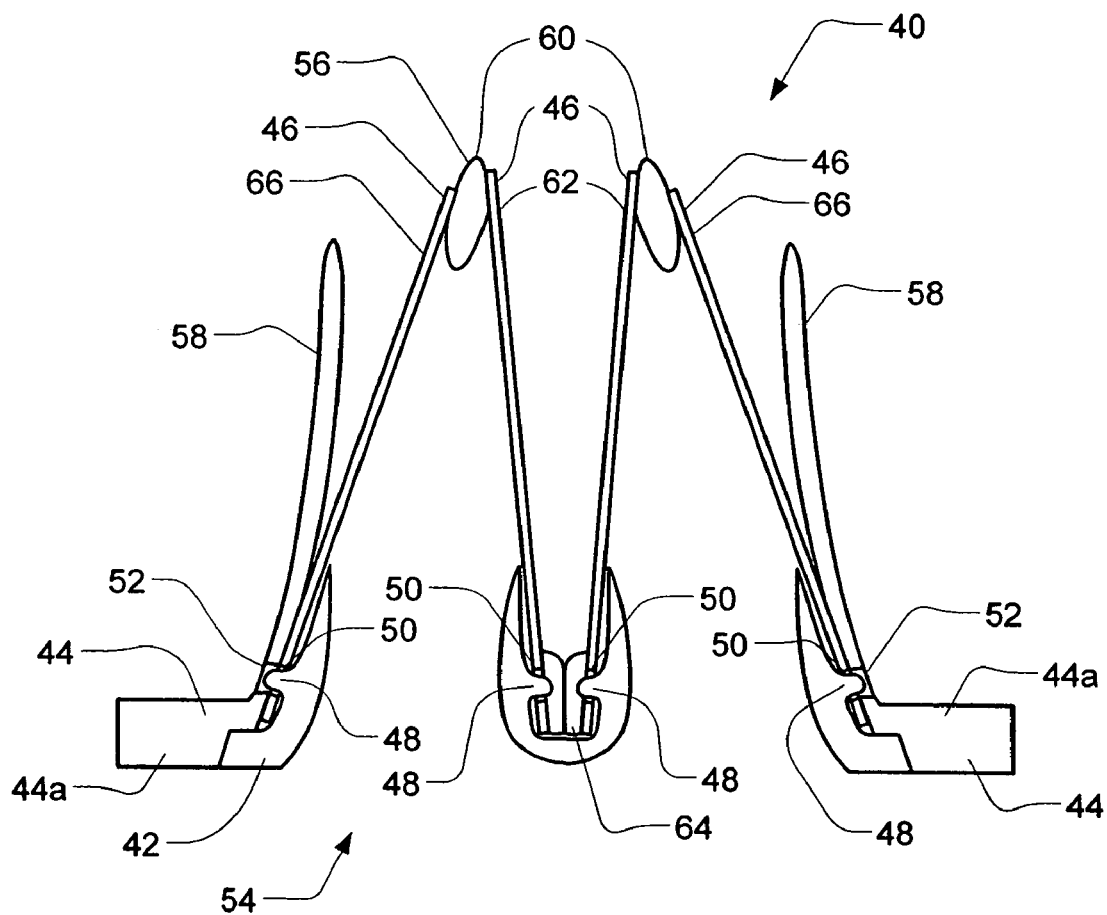
FIG. 4 is a cross-sectional diagram of a recently derived reed valve in the prior art.
Figure 5:
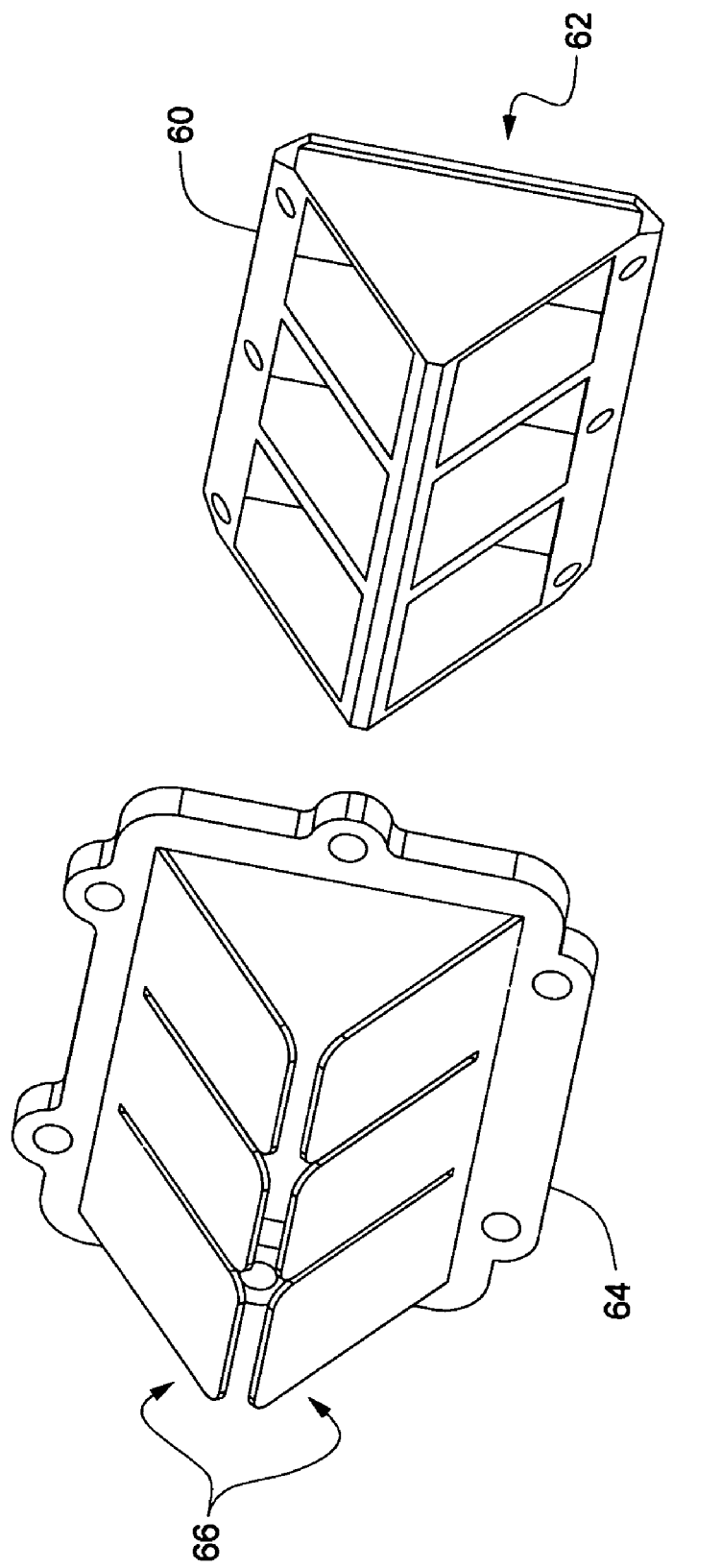
FIG. 5 is an exploded view of a preferred embodiment of the present invention.
Figure 6:
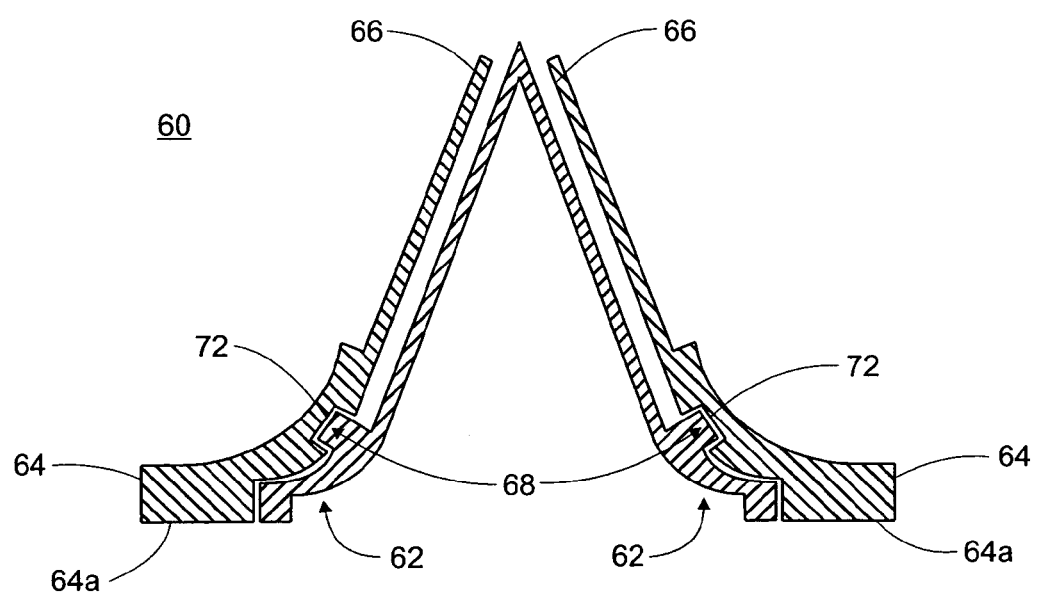
FIG. 6 is a cross-sectional view of the embodiment of the present invention shown in FIG. 5.

A preferred embodiment of the reed valve assembly 60 of the present invention as shown in FIG. 5 includes a reed cage 62 and a retainer 64, with reed petals 66 that are an integral part of retainer 64. The retainer 64 is independently interlockable with reed cage 62. As defined herein, independently interlockable is understood to mean that no separate parts are required to connect the retainer 64 to the reed cage 62. As implied by the term interlockable, the retainer 64 and reed cage 62 are separable.

Figure 7:
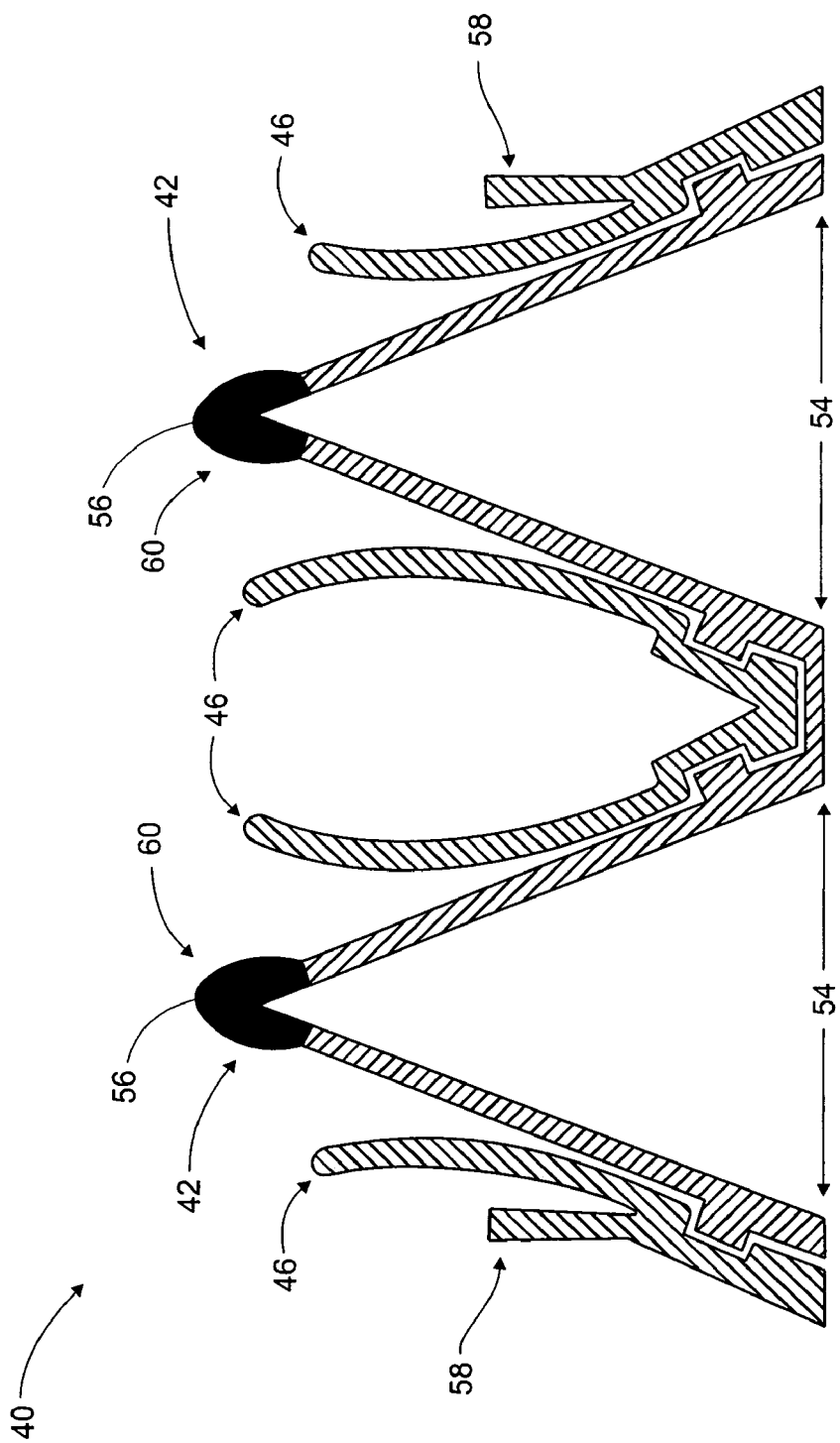
FIG. 7 is a cross-sectional view of another preferred embodiment of the present invention.

In the same embodiment, as shown in cross-section in FIG. 7, the reed petals 66 are an integral part of the retainer 64. The retainer 64 is a flange 64a, one of several possible embodiments for the retainer 64. Tabs 68 are formed in the reed cage 62. The flange 64a is slotted 72 to accept the tabs 68, thereby interlocking the retainer 64 to the reed cage 62.

In traditional reed valve design, the retainer is, in most cases, metal such as aluminum or steel. The separate reed petals are typically fiber reinforced plastic composite. In a preferred embodiment of the present invention, the retainer and the reed petals are molded as one piece out of fiber reinforced plastic composite. In addition, nylon and urethane, as well as other materials known to those skilled in the art, can be used for other embodiments.

In another embodiment of the present invention, as shown in cross-section in FIG. 7, the reed cage 42 is w-shaped. The reed valve assembly 40 is designed such that the reed petals 46 pivot on the base 54 of the reed cage 42 to open at the tip 56 of the reed cage 42, allowing airflow moving from the base 54 to the tip 56. When the reed petals 46 open, the opening at the tip 56 is approximately as wide as the base 54, as is the case with traditional reed valves 10. The benefit of the reed cage 42 with a w-shape is that none of the reed petals 46 need to pivot as far as reed petals 14 on the traditional reed valves 10 to generate the same size opening at the tip 56. The reduced pivot reduces wear on the reed petals 46 and increases the speed with which the reed petals 46 can react to changes in airflow direction. This speed is particularly important when the reed petals 46 are opening and closing more than 100 times per second. The reed petals 46 may be secured at differing heights. The environment surrounding the reed valve assembly 40 is tapered from the base 54 side of the environment to the tip 56 side. The differing heights of the reed petals 46 permits the assembly 40 to conform to the environment. The reed cage 42 may further comprise at least one airfoil tip 60, improving the aerodynamics of the reed valve assembly. The retainer 44 still further comprise at least one reed stop 58. The reed stop 58 is used to stop the reed petals 46 from pivoting too far causing increased wear on the reed petals.

Another preferred embodiment of the reed valve assembly 40 includes making the retainer 44 manually interlockable with the reed cage 42. Manually interlockable is understood to mean the retainer 44 is interlocked with the reed cage 42 by hand, without the assistance of any tools, such as a screwdriver.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

The invention claimed is:

1. A reed valve for use in a 2-stroke internal combustion motor assembly comprising:
   a reed cage; and
   a single retainer including in one piece a plurality of reed petals wherein the retainer is independently interlockable with the reed cage.

2. The reed valve assembly of claim 1 wherein the reed cage is w-shaped.

3. The reed valve assembly of claim 1 wherein the reed cage further comprises at least one airfoil tip, thereby improving the aerodynamics of the assembly.

4. The reed valve assembly of claim 1 wherein the retainer further comprises at least one reed stop.

5. A reed valve for use in a 2-stroke internal combustion motor assembly comprising:
   a reed cage; and
   a single retainer independently interlockable with the reed cage wherein the retainer includes in once piece a plurality of reed petals and is manually interlockable with the reed cage thereby avoiding the need for tools when assembling.

* * * * *